Sept. 6, 1938.  P. H. SANBORN  2,129,240
METHOD AND APPARATUS FOR MOLDING ARTICLES
Filed Dec. 18, 1936  3 Sheets-Sheet 1

Inventor
Paul H. Sanborn
By Bacon & Thomas
Attorneys

Sept. 6, 1938. P. H. SANBORN 2,129,240
METHOD AND APPARATUS FOR MOLDING ARTICLES
Filed Dec. 18, 1936 3 Sheets-Sheet 2
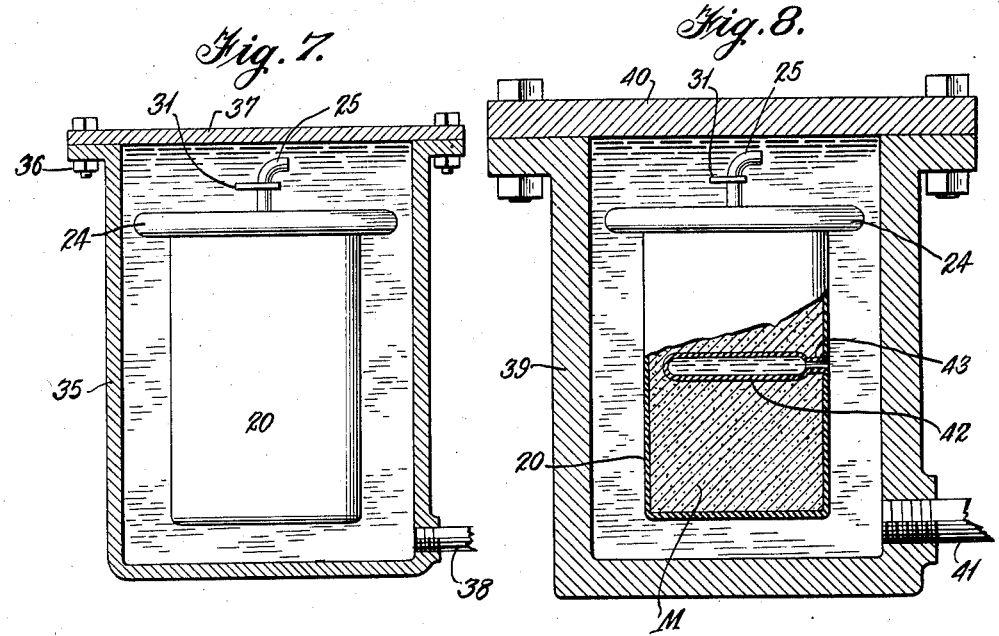
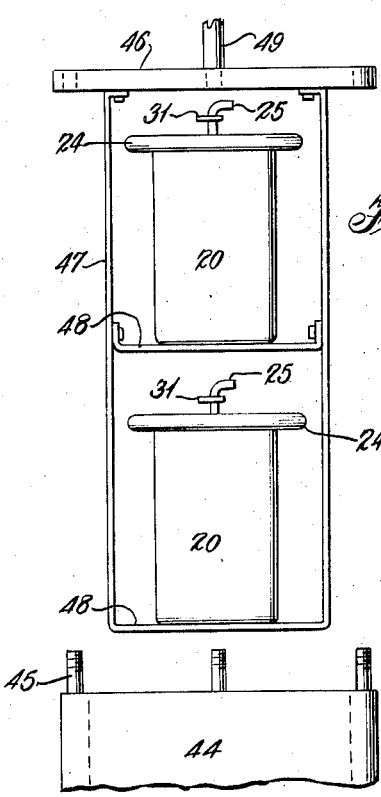
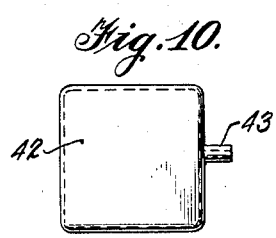
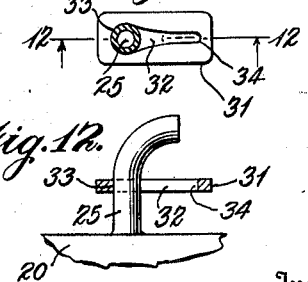
Inventor
Paul H. Sanborn
By Bacon & Thomas
Attorneys Sept. 6, 1938. P. H. SANBORN 2,129,240
METHOD AND APPARATUS FOR MOLDING ARTICLES
Filed Dec. 18, 1936 3 Sheets-Sheet 3
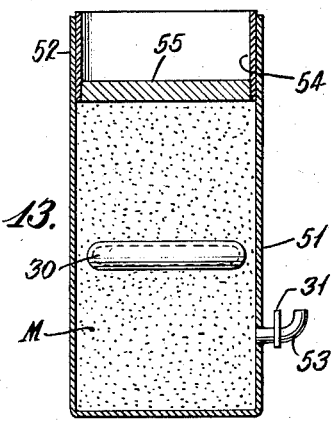
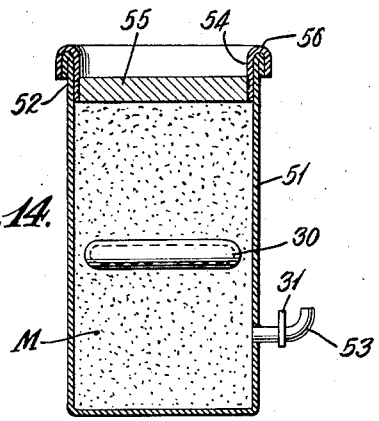
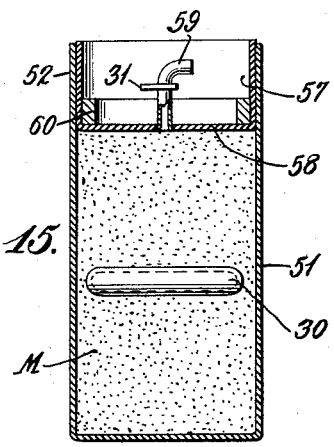
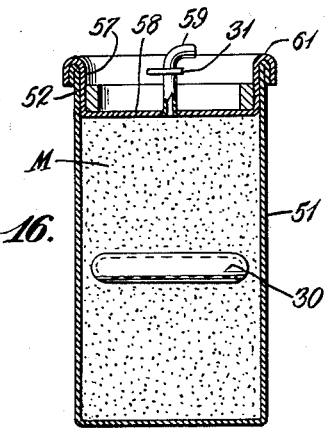
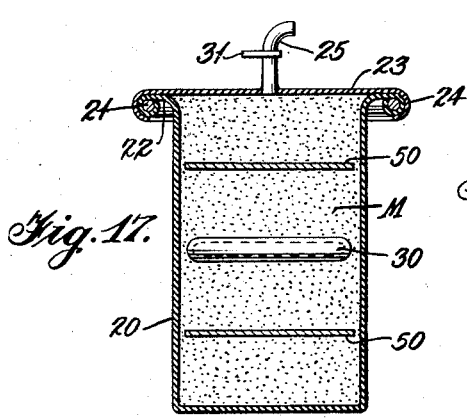
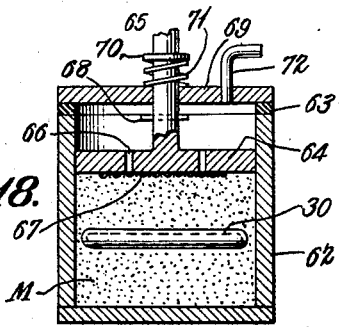
Inventor
Paul H. Sanborn
By Bacon & Thomas
Attorneys Patented Sept. 6, 1938

2,129,240

UNITED STATES PATENT OFFICE 2,129,240

METHOD AND APPARATUS FOR MOLDING ARTICLES

Paul H. Sanborn, Huntington, W. Va.

Application December 18, 1936, Serial No. 116,610

17 Claims. (Cl. 25—45)

This invention relates to new and useful improvements in methods and apparatus for molding various articles from powdered or granular material by means of pressure which is exerted on the mass or batch of material in such a manner that all parts of the same receive equal pressure applications. While the methods and apparatus are applicable to the forming of articles from a great variety of compositions, they are particularly adapted to the manufacture of fire clay and special refractory slabs or bats, heavy refractory blocks used in glass manufacture, and similar articles used in terra cotta industries.

The primary object of this invention is to provide methods and apparatus for forming different shaped articles from powdered or granular material by the application of substantially uniform pressures to the masses or batches of material so that all portions of the material will be rendered uniformly dense.

A still further object of the invention is to provide methods for molding or shaping articles from powdered or granular material wherein the various steps of the methods may be carried out by separate apparatus units with the result that numerous articles can be molded or shaped simultaneously.

Another object of the invention is to provide means for confining the granular or powdered material to enable uniform pressure applications to be applied to all external surfaces of the same.

Some of the advantages resulting from the use of these methods and the apparatus employed for carrying out the same are: uniformity and controlled density of the resultant articles whereby a uniform firing shrinkage may be effected, lower moisture content during forming, quicker processing time, adaptability to a variety of compositions not successfully formed by other methods known to me, due to lack of bonding materials, and generally improved properties of the final product.

Successful manufacture of articles from granular or powdered material, preferably clay, depends largely upon the condition of the material. There are no set rules for preparing clay for the manufacture of refractory materials, or the like. Each clay and the articles produced therefrom differ in physical characteristics. The most important factors are (1) grinding, (2) moisture content, and (3) uniform mixture of clay particles.

Grinding is usually done in dry pans, and the grading or sizing over a vibrating screen. The proper sizing of the clay particles is an important factor in the making of a good product, but this sizing varies with the physical characteristics of clay. The material to be molded or shaped is prepared by mixing the same with water during the time the material is being ground in the dry pans. The moisture needed depends entirely upon the type of clay. Some soft, fine clays require from 9% to 12% of moisture, while the clays of a flinty nature require from 6 to 9%. In most instances, the desired water content is less than 12%. More water increases the drying time and does not improve the quality of the product. If desired, more water than is necessary may be added to improve the mixture, after which the mixture may be dried to the proper moisture content and then pulverized. The necessity for adding water to improve the mixture is dependent entirely upon the characteristics of the clay being handled.

In the accompanying drawings, forming a part of this specification, and in which like numerals are employed to designate like parts throughout the same, Figure 1 is a partly sectional view and partly elevational view of apparatus employed for initially filling containers used to confine the material while it is being molded or shaped;

Fig. 7 is a vertical sectional view of a pressure chamber in which the filled container of Fig. 2 is subjected to initial hydraulic pressure;

Fig. 8 is a vertical sectional view of the chamber employed for subjecting the molding containers to a final high fluid pressure treatment to complete the molding or shaping of the desired articles;

Fig. 9 is an exploded view of a modified form of pressure applying chamber and container supporting rack which enables a plurality of molding containers to be simultaneously subjected to fluid pressure;

Fig. 10 is a plan view of a form of elastic envelope which is illustrated in section in Fig. 8 and is employed for applying fluid pressure to the interior of a molding container;

Fig. 11 is a partly plan and partly transverse sectional view of a clamp employed for closing or sealing the evacuation connection for a molding container;

Fig. 12 is a longitudinal sectional view taken on the line 12—12 of Fig. 11;

Figs. 13 and 14 are vertical sectional views of a modified form of molding container;

Figs. 15 and 16 are vertical sectional views of a still further modified form of molding container;

Fig. 17 is a vertical sectional view of a molding container and illustrates a way of loading or filling the container to permit a plurality of separate articles to be simultaneously formed therein, and Fig. 18 is a vertical sectional view of a steel die or mold adapted for use with hydraulic or mechanical presses for manufacturing firebrick.

Figure 1:
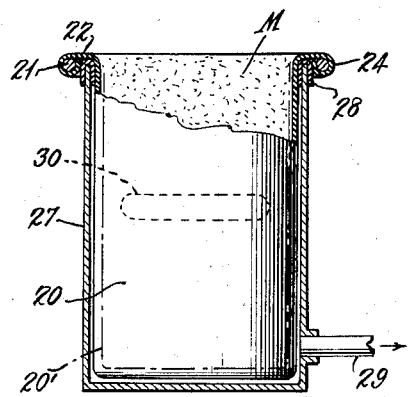
Figure 2:
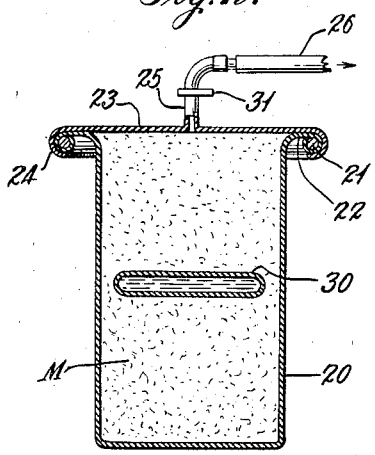
Fig. 2 illustrates a vertical section of a completely filled molded container which is sealed to permit evacuation of its contents.

The clay or other granular or powdered material, after being properly prepared, is charged into a container of proper size and shape and with the container formed entirely of elastic material, such as rubber. Figures 1 and 2 disclose one form of container which is well adapted for carrying out my novel methods. This container consists of a main body portion 20 which is open at one end and has the margin of its open end stretched around and cemented to a ring 21. This ring is provided with a diameter greater than the diameter of the interior of the container body 20, and a stretching of the edge portion of the container body over the ring produces a top flange portion 22.

Figure 3:
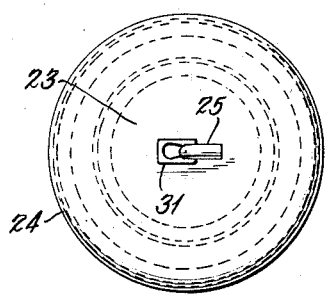
Fig. 3 is a top plan view of the container illustrated in Fig. 2.

As it is necessary to evacuate the container 20 to remove gases from the material, to prevent stratification or the formation of laminations in the final article, the open end of the container 20 must be closed and sealed. Figures 2 and 3 illustrate a form of closure for the container 20. This closure consists of a main body portion 23, formed of elastic material, which is molded to provide an inwardly curved marginal flange 24. The diameter of this closure is such that it must be stretched over the open end of the container 20. This stretching of the closure over the container end places the margin of the closure under tension and prevents leakage. A rubber tube 25 is suitably cemented to the body portion 23 of the closure to enable the interior of the sealed container to be connected to a vacuum by means of the conduit 26.

Figure 4:
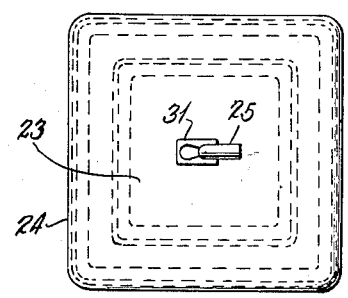
Fig. 4 is a top plan view of a molding container and illustrates possible modifications of the shapes of containers which may be employed in carrying out the methods.

Figure 3 illustrates a container of circular formation. Figure 4 illustrates a container of square formation in transverse section. These two disclosures are intended to indicate the possibility of providing containers of widely different shapes.

To accomplish charging of the container 20 with the granular or powdered material to be molded, the container 20 with the closure removed is positioned within a metal can 27. The upper edge of the can is provided with a rubber gasket or packing member 28 upon which rests the marginal flange 22 of the container. A vacuum connection 29 is provided for the can 27. The dot and dash line 20' indicates the normal size or diameter of the container 20 when initially positioned within the can 27. Connection of the space between the exterior of the container and the interior of the can with a vacuum causes the container wall to be stretched into engagement with the can, or into the full line position of Figure 1. With this external vacuum applied to the container, the granular or powdered material M is deposited into the container.

For the purpose of partially dividing the material deposited in the container 20 into two portions or masses and for the further and more important purpose of applying pressure internally to the material while being molded, a rubber envelope 30 is properly positioned within the material M deposited in the container. This rubber envelope is to be filled with a fluid, such as water, and completely sealed. Its location within the batch or mass of material depends entirely upon the desired division of the batch into two parts or portions. In other words, if it is desired to divide the batch into portions of different sizes, the envelope 30 will be positioned closer to one end of the container.

After the container is properly charged with the material M, the elastic closure is stretched over the open end of the container. After application of the closure, the vacuum, which is employed for stretching the container into contact with the walls of the can 27, is broken and the elastic container then attempts to return to its normal size, with the result that the material is squeezed and thereby compacted slightly. This makes the container more rigid and facilitates handling. It also allows the material to be packed more densely in the container.

The interior of the container then is connected to a vacuum by means of the conduit 26. The evacuation of the container results in the drawing off of substantially all of the gases from between the particles of the material. The internal vacuum also compacts the mass slightly and prevents cracking of the material when it is later subjected to high external fluid pressures. After a proper vacuum has been created within the sealed container, a clamp 31 is applied to the rubber tube 25, which is connected to the closure of the container. Figures 11 and 12 illustrate the structural formation of this clamp. The clamp consists of a plate-like body, formed of metal or other strong rigid material, and is provided with an aperture 32 which is shaped with an enlarged end portion 33 of a size to readily receive the rubber tube 25. The aperture 32 tapers towards the end 34 so that when the tube 25 is forced into this tapered or reduced end portion, the tube is collapsed and tightly pinched to prevent loss of vacuum within the container. The use of a rubber tube 25 and the rigid clamp 31 permits the container to be evacuated without employing any metallic connections or valve devices directly associated with the containers. Such metallic connections and valve devices will operate for only a short length of time when subjected to the high fluid pressures employed to properly compress the material to be molded.

To properly mold the granular or powdered material, it must be subjected to very high hydraulic pressure. Pressures in the neighborhood of 5000 pounds per square inch have been found to be very satisfactory. The subjecting of the material within the elastic container to high fluid pressures results in an appreciable linear contraction of the material. This contraction has been known to be as high as 20%. The greatest amount of contraction, or reduction in size of the mass, takes place during lower pressures and becomes less with increasing pressures. With certain mixtures, there is no further appreciable contraction at pressures above 2000 pounds per square inch, and most of the contraction takes place up to 500 pounds per square inch.

It will be appreciated that to subject a molding container to a pressure of 5000 pounds per square inch requires the use of a pressure chamber of great strength. It has been determined that the walls of a pressure chamber of a given size to withstand the 5000 pounds pressure must have a minimum thickness of 4" when made of cast steel. If the size of the pressure chamber is increased, the thickness of the chamber walls must likewise be increased. A pressure chamber having a wall thickness of 4" is very expensive and the cost does not increase in proportion to the rate of increase of thickness of the walls.

As most of the contraction of the material takes place at the lower pressures, it is very desirable to subject the containers to a low pressure in one chamber and the high final pressure in a second chamber. This permits the low pressure chamber to be made with walls of considerably less thickness and permits the high pressure chamber to be made of a smaller size than would be possible if it were to receive the molding container prior to contraction of the same.

Figures 7 and 8 disclose the high and low pressure containers. The low pressure container 35 in Figure 7 is formed of a main body portion having the flanged upper edge 36, to which is bolted the cover 37. A fluid pressure connection 38 is provided in one wall of the chamber 35. This figure discloses a container 20 positioned within the chamber 35 and being subjected to fluid pressure of approximately 500 pounds per square inch. After the contents of the container 20 have been subjected to the 500 pounds pressure for a suitable length of time, the external pressure is removed and the container is withdrawn from the chamber 35 for the purpose of enabling it to be inspected.

If the container 20 were not evacuated prior to the application of fluid pressure, the likelihood of the molded article being cracked during this step of the process would be greatly enhanced. Although poor or insufficient evacuation prior to the application of fluid pressure in chamber 35 does not always crack the molded article, it has sometimes been found that poor evacuation will cause this to occur. It is possible to determine whether sufficient vacuum has been created within the container 20 after it is removed from the pressure chamber 35. When the container is withdrawn from the pressure chamber 35, the container should be tightly drawn against the compressed material. If it is not, the partially formed material will sometimes be found to be cracked if the container is opened. The container, upon removal from the chamber 35, should be wrinkled and should have no air spaces between the wall of the container and the compacted mass. If the container is loose on the compacted mass, after removal from the chamber 35 it is a positive indication that the container 20 has been insufficiently evacuated in the drier step. If the condition of the container indicates that an insufficient vacuum has been created, the container should be further evacuated before it is subjected to further and higher fluid pressures.

After the container has been subjected to a proper internal vacuum and a proper low fluid pressure in the chamber 35, it is ready to be placed in the high fluid pressure chamber 39, shown in Figure 8. This high pressure chamber 39 is of the same general form as the pressure chamber 35 shown in Figure 7, but the walls of the main body portion and of the cover 40 are of increased thickness. A connection 41 is provided for the chamber 39 to produce the high fluid pressure desired within the chamber.

It was explained in connection with Figures 1 and 2 that a sealed liquid-containing envelope was placed in the mass within the container for the purpose of partially dividing the mass into two separable portions or blocks. This elastic envelope functions also to apply internal pressure to the material when it is subjected to fluid pressure within both of the pressure chambers 35 and 39. As the material within the container 20 is subjected to fluid pressure, it becomes harder and the hardness of the material increases as the pressure is increased. As the material becomes harder, it offers more resistance to the transmission of pressure to the interior of the mass. The envelope functions to apply internal pressure to the mass as the pressure is built up in the chambers.

Figures 8 and 10 illustrate a modified form of envelope which may be employed with the containers 20. This envelope 42 is made of elastic material, such as rubber, and is provided with a stem 43 which is suitably cemented to a side wall of the container, as illustrated in Figure 8. The tube 43 maintains communication between the interior of the envelope and the exterior of the container. When a container having an envelope 42 is subjected to fluid pressure in the chambers 35 and 39, the fluid pressure is admitted to the interior of the envelope 42 and a uniform pressure is obtained within this envelope and within the chamber exteriorly of the container. This communication between the envelope and the pressure chamber assures uniform application of fluid pressure both internally and externally of the container.

Figures 7 and 8 illustrate the containers as if they were floating in the fluid in the pressure chambers 35 and 39. This manner of illustrating the containers has been adopted for the sake of clearness. Actually, the containers will not float but will rest upon the bottom walls of the chambers. Figure 9 illustrates the manner in which a plurality of containers may be supported within a pressure chamber so that a single chamber may be employed for molding or compressing a plurality of masses of material. The pressure chamber structure of Figure 9 consists of the chamber body 44 which is provided with a plurality of upstanding threaded studs 45. A cover 46 is provided for the chamber 44 and has depending therefrom a rack 47 having a plurality of shelves 48 formed therein. Containers 20 may be positioned on the shelves 48 and inserted into the chamber 44 when the cover 46 is positioned upon the securing studs 45. Suitable nuts, not illustrated, should be applied to the threaded ends of the studs 45 for tightly clamping the cover 46 to the chamber body. A rod 49 of an air hoist or similar device is shown attached to the cover 46 as a means for lifting said cover to remove the container. A connection is provided for applying fluid pressure to the interior of the chamber 44 similar to that as shown in Figures 7 and 8.

Figure 5:
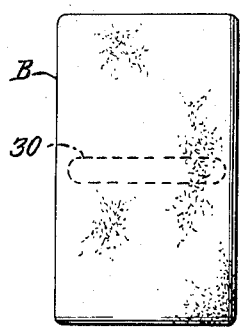
Fig. 5 is an elevational view of a completely formed block or slab as it is produced by the methods embodying my invention.
Figure 6:
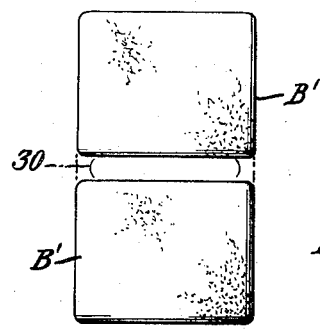
Fig. 6 is an elevational view illustrating the manner in which the article of Fig. 5 may be divided into a plurality of separate pieces.

Figures 5 and 6 illustrate the article as it is molded or compressed in a rubber container 20. When the article is removed from the container, it has embedded therein an envelope 30 or 42. Figure 5 illustrates in dotted lines an envelope 30 positioned within the molded block B. This envelope practically divides the block into two parts.

The comparatively thin wall of material remaining between the periphery of the envelope and the exterior surface of the block provides a weak connection between the two portions of the block, and the block may be broken into two parts B', see Figure 6, at this weakened portion.

Figure 17 illustrates the manner in which the contents of an envelope 20 may be divided into a plurality of separable parts, for example, four in number. This division of the initial block into four parts is accomplished by properly positioning an envelope 30 and separate plates 50 within the mass of granular or powdered material.

Figures 13 and 14 illustrate a modified form of container. This container consists of a body 51 which is made entirely of elastic material, such as rubber. The marginal portion 52 of the upper end is not reinforced or supported by a metallic ring, as is the case with the container 20 previously described. For the purpose of evacuating the interior of the container 51, a rubber tube 53 is suitably cemented thereto. The same form of clamp 31, described in connection with the previously referred to container, is employed for sealing the tube 53.

After the material M is placed within the container 51, with the envelope 30 properly arranged within the material, the open end of the container is to be closed for the same reasons as advanced in connection with container 20. An entirely different form of closure is provided for the container 51. This closure consists of a section of rubber tubing 54 which has cemented within one end portion of the same a metallic disc 55. This closure is inserted in the container 51 with the disc 55 arranged innermost. The closure is inserted in the container until the outer edge of the section of tubing 54 registers the outer edge of the margin 52 of the container. To effectively seal between the closure and the container, the outer edge portions of these elements are folded outwardly and downwardly, as illustrated at 56 in Figure 14. The edges of the tubular section 54 and the container wall 52 may be folded downwardly to any extent desired. If the tension resulting from the folding of the edges of the container and closure tube is not sufficient to completely seal the container when folded to the extent illustrated in Figure 14, the edge portions may be folded sufficiently to cause them to surround the periphery of the metallic disc 55. With the edges folded to this extent, a rubber band may be applied thereto for providing additional tension.

Figures 15 and 16 illustrate a still further modified form of container. The container body of this form is the same as that illustrated in Figures 13 and 14 with the exception that the vacuum connection tube 53 is not attached to the body. The body portion of the container therefore, will be designated by the reference character 51 while the upper marginal portion will be designated 52. After the material M is positioned within this container 51, and a sealed fluid filled envelope 30 properly arranged within the material, the container is to be closed to permit evacuation thereof.

The closing of this container is effected by means of a substantially cup-shaped rubber member 57 which is provided with a closed bottom 58. A vacuum connection rubber tube 59 is suitably cemented to the closed bottom 58 of the cup-shaped member. A clamp 31 is employed for closing or sealing the tube 59 after evacuation of the container 51. For the purpose of reinforcing the cup-shaped closure member, a metallic ring 60 is cemented at its periphery to the side wall portion of the cup-shaped closure member.

To effect sealing between the closure member and the wall of the container 51, after the closure member has been inserted in the container to the extent illustrated in Figure 15, the margins of the closure member and container are folded outwardly and downwardly at 61. This folding operation may be varied in the same manner as described in connection with the disclosure of Figure 14.

Figure 18 illustrates the use of a sealed envelope in the manufacture of firebrick by means of steel dies or molds which are actuated by hydraulic or mechanical presses. The material M is positioned within the steel die or mold 62 with a liquid filled envelope 30 properly arranged within the material. The upper edge of the die or mold 62 is provided with a suitable sealing means 63.

The plunger unit, actuated by hydraulic or mechanical press mechanism, consists of the plunger plate 64 which is provided with a plunger rod 65 preferably formed integrally therewith. The plunger plate has formed therein a suitable number of apertures 66 which pass entirely therethrough in an axial direction. A layer of porous or fibrous material 67 is secured to the bottom surface of the plunger plate 64 for closing the apertures 66 to a sufficient extent to prevent passage of the particles of material through the apertures when the space above the plunger plate 64 is connected to a vacuum.

The plunger rod 65 has passed therethrough a pin 68. Positioned upon the rod 65, outwardly of the pin 68 is a tight closure or cover 69. A stop or abutment 70 is fastened to the closure rod 65 and has interposed between it and the cover or closure 69 a spring 71. A vacuum connection 72 is suitably attached to the closure 69.

In the use of this hydraulic die or mold, the mechanism of the press operates to withdraw the plunger plate 64 from the interior of the die 62. The material M with the envelope 30 then is charged into the die. On the return stroke of the press mechanism, the plunger plate 64 enters the top or open end of the die and moves downwardly therein. The spring 71 when the plunger plate is withdrawn from the die, moves the die cover or closure 69 against the stop pin 68.

As the plunger plate 65 is moved inwardly of the die, the cover plate 69 engages the sealing means 63. A vacuum then should be connected to the tube 72 to start evacuating the interior of the die. The engagement of the cover 69 with the sealing means 63 seals the open end of the die. The plunger plate continues its movement inwardly of the die 62 while the cover 69 remains stationary. The spring 71, therefore, is compressed during this separate inward movement of the die plate 64. After proper pressure has been applied to the material M by the inward movement of the plunger 64, the press mechanism operates to withdraw the plunger plate. Outward movement of the plunger plate with the cover 69 remaining in engagement with the sealing means 63, takes place until the pin 68 again engages the cover 69. The cover then will be removed from the packing ring 63 and the vacuum will be broken in the die 62.

It is customary for hydraulic and mechanical press dies or molds to be provided with ejector mechanism for ejecting the molded article from the die after the article has been properly formed. No attempt has been made to illustrate a conventional form of ejector mechanism, as any desired, well known form may be employed.

The forms of this invention herewith shown and described are to be taken as preferred examples of the same, and that various changes in the shape, size and arrangement of parts may be resorted to, without departing from the spirit of the invention or the scope of the subjoined claims.

Having thus described the invention, I claim:—

1. The method of forming a compressed shape from powdered or granular material, which comprises introducing the material into an elastic container which completely encloses the material and which is of a larger size than that of the desired article, and compressing the container with the material therein by substantially uniform fluid pressure applied both internally and externally of the container.

2. The method of forming a compressed shape from powdered or granular material, which comprises connecting the material within a sealed container to a high vacuum, withdrawing gases from the pores of said material, disconnecting the material within said container from the high vacuum, and compressing the material within the container by fluid pressure exerted both interiorly and exteriorly of the container.

3. The method of forming a compressed shape from powdered or granular material, which comprises introducing the material into an elastic container which completely encloses the material, connecting the material within the container to a high vacuum to withdraw gas from the pores thereof, disconnecting the material within said container from the high vacuum, and compressing the material within the container by fluid pressure exerted both interiorly and exteriorly thereof.

4. The method of forming an article for firing, which comprises preparing a substantially uniform mixture of powdered material, introducing the material into an elastic container which completely encloses the material and which is of substantially the same shape as that of the desired article, sealing and evacuating the container, and compressing the contents of the container by uniform fluid pressure applied both internally and externally of the container along every line passing through the container.

5. The method of molding powdered or granular material, which comprises subjecting the exterior of an elastic container to a vacuum to expand the container, filling the container while expanded, sealing the container, releasing the exterior vacuum and subjecting the interior of the sealed container to a vacuum, releasing the interior vacuum, and compressing the material in the container by fluid pressure applied both internally and externally of the container.

6. The method of molding powdered or granular material, which comprises subjecting the exterior of an elastic container to a vacuum while confined in a space of larger size than but of the same shape as the article to be molded to expand the container, filling the container while expanded, sealing the container, releasing the exterior vacuum, and subjecting the interior of the sealed container to a vacuum, releasing the interior vacuum, and compressing the material in the container by fluid pressure applied both internally and externally of the container.

7. The method of forming a compressed shape from powdered or granular material, which comprises introducing the material into an elastic container of a larger size than that of the desired article, evacuating said container, initially compressing the contents of the container by substantially uniform fluid pressure applied both internally and externally of the container, removing the initial pressure to permit inspection of the container, subjecting the interior of the container to a further evacuation, and then finally compressing the contents of the container by substantially uniform fluid pressure higher than the initial pressure.

8. The method of forming a compressed shape from powdered or granular material, which comprises introducing the material into an elastic container of a larger size than that of the desired article, initially compressing the contents of the container by substantially uniform pressure applied both internally and externally of the container, removing the initial pressure to permit inspection of the container, subjecting said material in the container to a high vacuum, and then finally compressing the contents of the container by subjecting the same to repeated applications of substantially uniform fluid pressure higher than the initial pressure and applied both internally and externally of the container.

9. The method of forming a compressed shape from powdered or granular material, which comprises introducing the material into an elastic container of a larger size than that of the desired article, initially compressing the contents of the container by substantially uniform pressure applied both internally and externally of the container, removing the initial pressure to permit inspection of the container, then finally compressing the contents of the container by subjecting the same to repeated applications of substantially uniform fluid pressure higher than the initial pressure and applied both internally and externally of the container, and subjecting the interior of the container to vacuum after each of certain applications of fluid pressure.

10. The method of forming a compressed shape from powdered or granular material, which comprises introducing the material into an elastic container, connecting the interior of the container to a high vacuum, disconnecting the interior of the container from the high vacuum, initially compressing the contents of the container by substantially uniform fluid pressure applied both internally and externally of the container, removing the initial pressure, and then finally compressing the contents of the container by substantially uniform fluid pressure higher than the initial pressure and applied both internally and externally of the container.

11. The method of forming a compressed shape from powdered or granular material, which comprises introducing the material into an elastic container, connecting the interior of the container to a high vacuum, removing the connection to the interior of said container to the high vacuum, initially compressing the contents of the container by a substantially uniform fluid pressure applied both internally and externally of the container, removing the initial pressure, subjecting the material in said container to a further evacuation, and then finally compressing the contents of the container by subjecting the same to repeated applications of substantially uniform fluid pressure which is higher than the initial pressure and is applied both internally and externally of the container.

12. The method of forming a compressed shape from powdered or granular material, which comprises introducing the material into an elastic container, connecting the interior of the container to a high vacuum, initially compressing the contents of the container by a substantially uniform fluid pressure applied both internally and externally of the container, removing the initial pressure, then finally compressing the contents of the container by subjecting the same to repeated applications of substantially uniform fluid pressure which is higher than the initial pressure and is applied both internally and externally of the container, and subjecting the interior of the container to vacuum after all but the final application of high fluid pressure.

13. Apparatus for molding powdered or granular material, comprising elastic means entirely surrounding said material for confining the material while being molded, means for compressing the confined material by the application of force applied exteriorly of the material, and an elastic element positioned in the confined material to partially separate the material into separable portions, said element exerting an internal pressure on the material due to its inherent resistance to compression.

14. Apparatus for use in molding powdered or granular material, comprising an elastic container body of substantially the same shape as the article to be molded, a ring of greater diameter than the body having the upper edge portion of the body stretched over and cemented thereto, an elastic cap for closing said container consisting of a central portion with a continuous, inwardly turned edge of a size to be stretched over said ring, and a tube cemented to said cap.

15. Apparatus for use in molding powdered or granular material, comprising an elastic container body of substantially the same shape as the article to be molded, one or more tubes cemented to the side wall of said body, and a closure for the open end of said container, said closure comprising a tubular section of elastic material, and a solid rigid disc cemented in one end of said tubular section, said closure being insertible in the open end of the container with the disc innermost, whereby the outer edge portions of the container and the closure wall may be folded outwardly and downwardly to tension and thereby seal between said portions.

16. Apparatus for use in molding powdered or granular material, comprising an elastic container body of substantially the same shape as the article to be molded, and a closure for the open end of said container, said closure comprising a cup-shaped elastic member, and a rigid ring positioned in the member against its closed bottom and cemented at its periphery to the side wall of said member, said closure to be inserted in the open end of said container with the ring innermost, whereby the outer edge portions of the container and the closure walls may be folded outwardly and downwardly to tension and thereby seal between said portions.

17. The method of producing a ceramic shape having minimized shrinkage when fired which comprises, subjecting the exterior of an elastic container to a vacuum while confined in a space of a larger size than, but of the same shape as the article to be molded to expand the container, filling the container while expanded, connecting the material in said container to a high vacuum, removing the connection to the material in said container from the high vacuum, and then compressing the contents by application of fluid pressure applied both internally and externally of the container in amounts sufficient to give the desired reduction in shrinkage when fired.

PAUL H. SANBORN.